United States Patent [19]

McCabe

[11] 4,040,304
[45] Aug. 9, 1977

[54] CLUTCH MOTOR FOR USE IN RESETTABLE FIRE DAMPER

[76] Inventor: Francis J. McCabe, 239 Hastings Court, Doylestown, Pa. 18901

[21] Appl. No.: 676,413

[22] Filed: Apr. 13, 1976

[51] Int. Cl.² .................. F16D 43/25; F16D 11/10
[52] U.S. Cl. ...................... 74/230.17 T; 192/67 P; 192/82 T; 192/83; 169/60
[58] Field of Search ............ 192/67 P, 82 R, 82 T, 192/83; 169/60; 74/230.17 T

[56] References Cited

U.S. PATENT DOCUMENTS

| | | | |
|---|---|---|---|
| 2,021,413 | 11/1935 | Gille | 192/82 T |
| 2,320,900 | 6/1943 | Walz | 192/82 T |
| 2,503,261 | 4/1950 | Hall | 192/82 T |
| 2,503,262 | 4/1950 | Hall | 192/82 T |
| 2,509,948 | 5/1950 | White | 192/82 T X |
| 2,570,515 | 10/1951 | Bonham | 192/82 T |
| 3,261,230 | 7/1966 | Rudnicki | 192/82 T |
| 3,382,852 | 5/1968 | De Lorean | 192/82 T X |
| 3,396,909 | 8/1968 | Seifert | 192/82 T |
| 3,730,151 | 5/1973 | Smith et al. | 192/82 T |
| 3,889,314 | 6/1975 | McCabe | 16/48.5 |

Primary Examiner—Allan D. Herrmann
Attorney, Agent, or Firm—Benasutti Associates, Ltd.

[57] ABSTRACT

An improved clutch is described for use in a smoke and fire protection system comprising a pulley which in the normal operating position is engaged by a torque transmitting means so that the pulley may be controlled by an associated drive mechanism such as a stall motor or break motor. Either upon receipt of a signal from a remote source or upon an increase in the ambient temperature surrounding the apparatus, such as might occur during a fire, a heat responsive means disengages the pulley from the torque transmitting means thereby allowing the pulley to freely rotate about its axis to deploy its associated fire protection equipment. In the preferred embodiment, one or more bimetallic links of either "straight" or serpentine configurations are employed to move the pulley axially along its axis of rotation, thereby disengaging the pulley from an adjacent associated drive plate.

8 Claims, 7 Drawing Figures

CLUTCH MOTOR FOR USE IN RESETTABLE FIRE DAMPER

BACKGROUND OF THE INVENTION

The present invention relates generally means utilizable with fire, smoke, air control or other types of apparatuses which are intended to control the operation of those apparatuses and to, at some preselected time, disengage the drive means from those apparatuses so that they will be free to respond in a preselected manner.

In U.S. Pat. No. 3,580,321, for example, a folding blade fire damper is described wherein a plurality of blades are held in the open position by a cable which is attached to the top of the damper frame and which loops under the damper blade before being attached to a motor energized spool. The damper is moved to the open position by energizing the motor and thereby winding the cable onto the spool to raise the blades against the top of the damper frame. Once the damper is fully opened, the motor will stall and maintain that position either until fusable link melts to release the cable under the blades or until powers cut off the motor thereby allowing spring 66 to act upon the drive shaft of the motor to disengage the motor from the remainder of the gear assembly attached to the spool. In this event, the gravitational or other forces exerted by the blades on the spool causes the spool to unwind and the damper to assume the closed position.

Another type of clutch assembly is illustrated in U.S. Pat. No. 3,665,996 which describes a closure mechanism which allegedly eliminates the necessity of using a fusable link purportedly because the use of fusable links is generally unsatisfactory "due to the delay involved in melting the link which enable the products of combustion to spread." When line voltage is no longer applied to the device described in U.S. Pat. No. 3,665,996, the electromagnet 26 releases armature 27 which enables lever 40 to pivot downwardly carrying with it motor 23 and driving spur gear 43. Spur gears 43 and 44 are thus disengaged, allowing the weight of the curtain carried by wires 3 and 4 through anchor 21 to cause drum 22 to rotate so that the curtain 10 is immediately lowered.

In U.S. Pat. No. 3,739,832, a motor operated overhead grill is described in which the motor, when powering the grill in descent, also loads the spring of an emergency grill opening means, which spring, when called upon to do so, is effective in raising the grill sufficiently to provide an emergency escape or exit opening beneath the grill. In the event of an emergency, a cable which is indirectly attached to a pulley disengages that pulley from the drive motor by disengaging a notch 52 on driving member 50 from driving pin 48 on motor shaft 46 by sliding movement 87 of the driving member 50 along the motor shaft 46. If the driving member 50 is moved into a clearance position from drive pin 48 when the grill is in the fully closed position, the helical spring 36 drives an otherwise free wheeling pulley which in turn causes the grill to move towards a partially open position.

Another such spool arrangement is described in U.S. Pat. No. 3,866,656 wherein a motor operating a geared pulley system is provided for retracting the blades of a folding blade fire damper. Drive means are provided attached to the motor operated system to counteract the frictional forces in the system by driving a portion of it in reverse, thereby allowing the retractive blades to fully extend when the motor is shut off.

In U.S. Pat. No. 1,968,719, an automatically operated fire curtain is described wherein a spring is wound and various parts are locked by the use of a lever 29 and the chain with the fusable link. When a fire occurs, the lever 29 releases the index blade and the spring 22 acts through the gears to move the curtain downward.

Other devices related to this general area are described in U.S. Pat. Nos. 3,156,430; 3,313,338; and 3,665,996.

SUMMARY OF THE INVENTION

The present invention generally relates to a clutch for use in a smoke or fire protection system comprising a pulley mounted for rotation about a first axis, torque transmitting means for transmitting torque to said pulley to control the rotation thereof and heat responsive means for disengaging the pulley from that torque transmitting means, whereby the pulley is free to rotate about its axis. When installed in a position similar to that illustrated in U.S. Pat. No. 3,580,321, where the clutch mechanism is disposed within the air duct, the clutch of the present invention will automatically respond to a preselected increase in the ambient temperature in the air duct to disengage the pulley from its otherwise controlling torque transmitting, thereby allowing cable wrapped around the pulley to be pulled therefrom by the weight of the descending fire damper blades. As a result, a novel clutch assembly is provided which is capable of providing substantial torques to the pulley to operate the associated fire equipment under normal conditions while rapidly and automatically disengaging the pulley from the remainder of the clutch for rapid deployment of its associated fire protection equipment. Upon return of the ambient temperature within the air duct to acceptable ranges, the clutch automatically reengages the torque transmitting means thereby allowing the associated fire protection equipment to be again remotely regulated.

Accordingly, a primary object of the present invention is the provision of a heat responsive clutch assembly for use with fire protection equipment. Another object of the present invention is the provision of a remotely actuatable clutch assembly. A further object of the present invention is the assembly which, under normal operating conditions, will provide for a positive power transfer between the motor and pulley assembly. These and other objects of the present invention will become apparent from the following more detailed description.

DETAILED DESCRIPTION OF THE DRAWINGS

Figure 1:
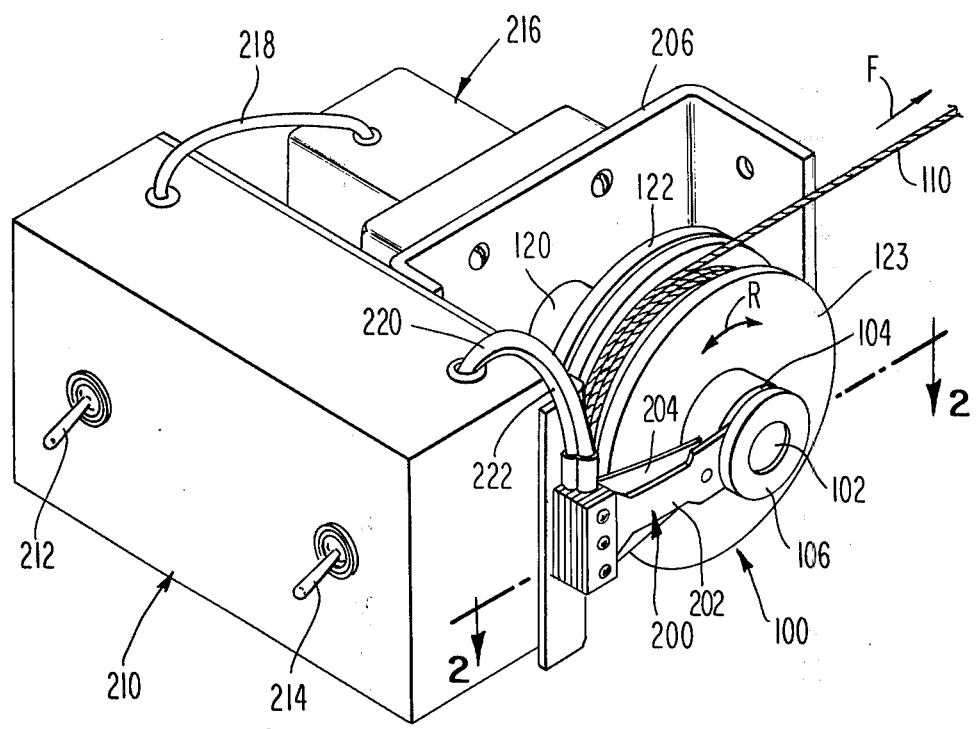
FIG. 1 is a perspective view of the preferred embodiment of my invention.

Although specific forms of the invention have been selected for illustration in the drawings, and the following description is drawn in specific terms for the purpose of describing these forms of the invention, this description is not intended to limit the scope of the invention which is defined in the appended claims.

FIG. 1 is a perspective view of the preferred embodiment of the clutch of the present invention, designated generally 100, shown in association with a motor, designated generally 216, a chassis designated generally 210 and a cable 110, which is connected to and which is utilized to operate a fire protection and/or air control apparatus which is not illustrated in the drawings. Most fire protection and/or air control apparatuses will create a force as indicated by vector F in FIG. 1 on cable 110, keeping this cable taut at all times. The cable is wrapped around pulley 123 which is rotatable around its axis as generally indicated by double-ended arcuate arrow R in FIG. 1. The motor 216 is operable through motor line 218 by electronic means disposed either in chassis 210 or at some remote location. For purposes of illustration, switch 212 is shown in FIG. 1, which switch is representative of an electronic control which could cause the motor to be activated in the forward or reverse directions at preselected speeds for preselected durations.

Figure 2:
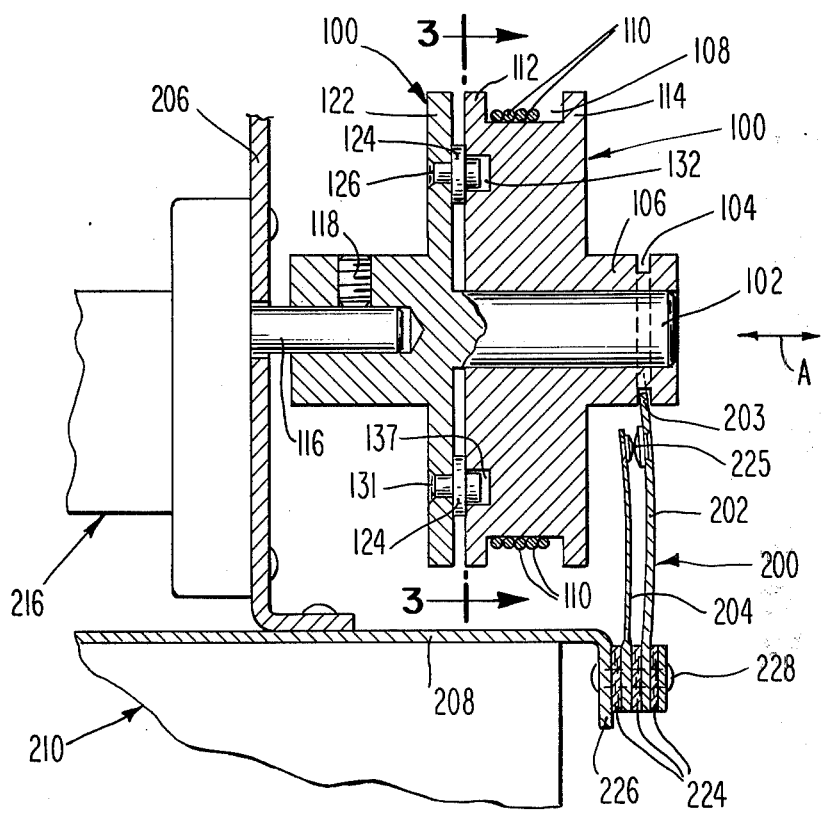
FIG. 2 is an enlarged cross-section of a portion of the preferred embodiment of the present invention taken as indicated by the lines and arrows 2—2 on FIG. 1.

Referring now to FIG. 2, motor 216 has a drive shaft 116 which extends through a motor mounting bracket 206 for engagement by the clutch designated generally 100, and more particularly, by drive shaft boss 120 and set screw 118. Drive shaft boss 120 is integrally formed with drive plate 122 which has the form of a substantially circular plate of similar diameter to the outside diameter of pulley 123 which is shown in FIG. 2 adjacent thereto. During the normal operation of the device, the drive shaft 116, the drive shaft boss 120 and the drive plate 122 are fixed with respect to each other for rotation about a central axis. Integrally formed with the drive shaft boss and drive plate is axle 102 which is coaxial with the axis of drive shaft 116. A pulley 123 is selected having a bore disposed therethrough so that it may be slipped over axle 102 to the position shown in FIG. 2 adjacent to drive plate 122. A cable race 108 is provided around its periphery and annular cable guides 112 and 114 are formed as annular projections on the periphery of the pulley 123 to retain the loops of cable 110 within the cable race 108 as the cable is wound thereon. The pulley 123 is further formed with a central annular pulley boss of a substantially lesser diameter than the diameter of the cable race 108. The pulley boss 106 extends around axle 102 and has formed therein an annular groove 104 which is concentric to the axis of drive shaft 116 and axle 102. Under normal operating conditions, pulley 123 is firmly engaged by drive plate 122 by means of drive pins 126, 128, 130 and 131 which engage portions of drive pin slots 132, 134, 136 and 137. Spacers 124 are provided around each of the aforementioned drive pins in order to maintain a slight space between pulley 123 and drive plate 122. In the normal position, pulley 123 may be rotated in either direction to control its associated fire protection and/or air control equipment. The rotation of the pulley 123 is controlled by the motor 216 which produces torques on drive shaft 116 which are transmitted by torque transmitting means comprising the aforementioned drive shaft boss 120, set screw 118, drive plate 122, drive pins 126, 128, 130 and 131, spacers 124, axle 102 and drive pin slots 132, 134, 136, and 137. The motor 216 and clutch 100 are mounted on a mounting plate 208 which has formed in one end thereof a link mount 226 on which a bimetallic device designated generally 200 is attached. The fire link designated generally 200 comprises a bimetal 202, a heating reed 204, insulation 224, a contact 225, and a rivet 228. Bimetal tip 203 is disposed within the annular groove 104 which is formed in the pulley boss 106. This bimetal is selected and configured to retain the pulley 123 against spacers 124 so that a positive interengagement between the pulley 123 and the drive plate 122 is maintained at preselected ambient operating temperatures. The pulley 123 which would otherwise be freely slidable along the axis A as indicated in FIG. 2 is thereby moved to and held in a normal or operating position along axis A by the bimetallic device designated generally 200.

Figure 3:
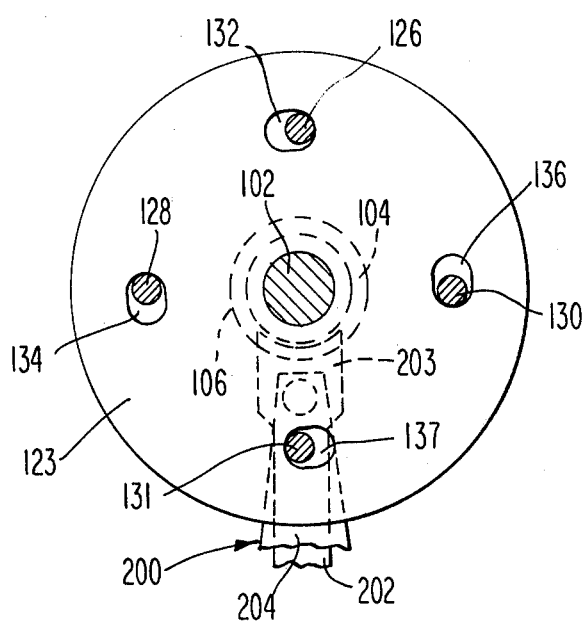
FIG. 3 is a cross-section of a portion of the preferred embodiment of my invention taken as indicated by the lines and arrows 3—3 on FIG. 2.

As seen in FIG. 3, the bimetallic device designated generally 200 has an arcuate tip 203 but is slightly spaced away from the bottom of annular groove 104, thereby acting only to guide the pulley with respect to axis A. In this position, pulley 123 is free to move with respect to drive plate 122 only by the degree facilitated by the fact that drive pin slots 132, 134, 136, and 137 are slightly longer than the associated drive pins. By making these slots slightly larger than the drive pins, minor dimensional irregularities and problems of alignment are avoided.

Figure 4:
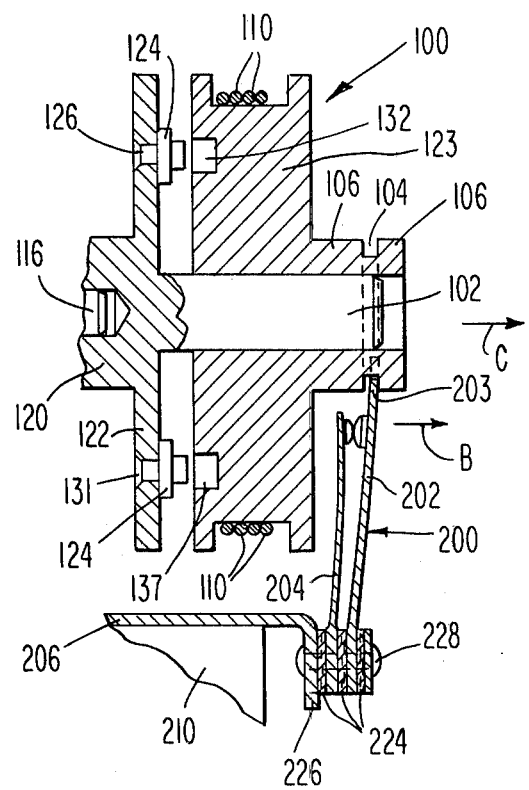
FIG. 4 is a partially cut-away cross-section of a portion of the preferred embodiment of my device, similar to the view shown in FIG. 2 wherein the heat responsive means has disengaged the pulley from the torque transmitting means, whereby the pulley is free to rotate about its axis.

Upon an increase in the ambient temperature around the clutch designated generally 100 and, in particular, around the bimetal 202, the bimetal spontaneously assumes the shape illustrated in FIG. 4, that is, the bimetal tip 203 has moved on an axis as indicated by arrow B in FIG. 4, which movement has in turn acted upon the side of annular groove 104 to move the entire pulley 123 along axis C in FIG. 4. As a result, the drive pins have separated from their respective drive pin slots and the rotation of drive shaft 116 will no longer transmit substantial torques to pulley 123. Since in this position the pulley 123 is free to rotate around axle 102, the tensions as illustrated by vector F on cable 110 will cause the cable to unwind from the pulley, thereby fully deploying associated fire protection equipment.

As seen from the foregoing description, a direct drive is created between the motor 216 and the cable 110, which is capable of withstanding and/or applying great torques which are transferred from the torque transmitting means directly to the pulley when the pulley is in the operating position. A heat responsive means comprising annular pulley boss 106 and its associated annular groove 104 act to move the pulley between first and second positions along its axis of rotation. In the first position, the pulley is positively engaged by the torque transmitting means connected to the drive shaft of the motor, whereas in the second position, the pulley is free to rotate about its axis to thereby rapidly deploy its associated fire protection equipment.

In the embodiment shown in the Figures, the bimetallic device designated generally 200 is further equipped with a heating reed 204 which, together with cables 220 and 222 and a power source, comprise an auxiliary heating means for the bimetal 202. The operation of this heating means to heat and deform the bimetal is similar to that described in my prior issued United States patents relating to bimetallic fire links, namely U.S. Pat. No. 3,725,972 and U.S. Pat. No. 3,889,314. (The former relates to a "straight" bimetallic fire link and the latter relates to a "serpentine" bimetallic fire link.) For purposes of illustration, chassis 210 is shown with a switch 214 which is illustrative of the fact that a remote control feature is incorporated into the present device which may actuate the clutch assembly even in the absence of a preselected rise in ambient temperature around the bimetal 202.

Figure 5:
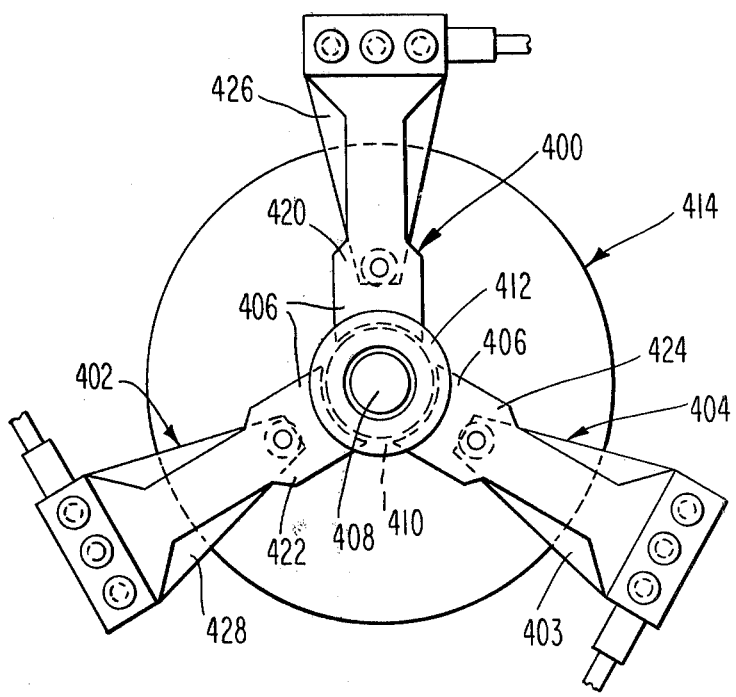
FIG. 5 is an end view of a portion of a second embodiment of the present invention wherein the heat responsive means comprises a plurality of bimetallic links disposed radially around the axis of the pulley.

Referring now to FIG. 5, which is an end view of a portion of a second embodiment of the present invention, a plurality of bimetallic devices 400, 402, and 404 are shown radially disposed around axle 408. The bimetallic tips 406 of each of the radially disposed bimetallic devices similarly engage an annular groove 410 formed in pulley boss 412. The pulley designated generally 414 would otherwise be disposed in association with apparatus similar to that shown in FIGS. 1 through 4 with the exception that additional mounting plates and mounting brackets are disposed around the pulley 414 to mount the bimetallic devices in the position shown in FIG. 5. As seen in FIG. 2, the use of a single bimetallic device in a configuration as illustrated in FIGS. 1 through 4 is effective even though the axial force applied by bimetallic tip 203 to the side of the annular groove is slightly offset from the central axis of axle 102. In order to provide substantially greater axial forces and/or to eliminate any vector components which are not coaxial with the axis of rotation of the pulley, embodiments incorporating a plurality of radially disposed bimetallic devices may be utilized. As in the preferred embodiment, each of these radially disposed devices may be provided with heating reeds 426, 428, and 430 which form a part of the auxiliary heating means for disengaging the pulley 123 from the torque transmitting means.

Figure 6:
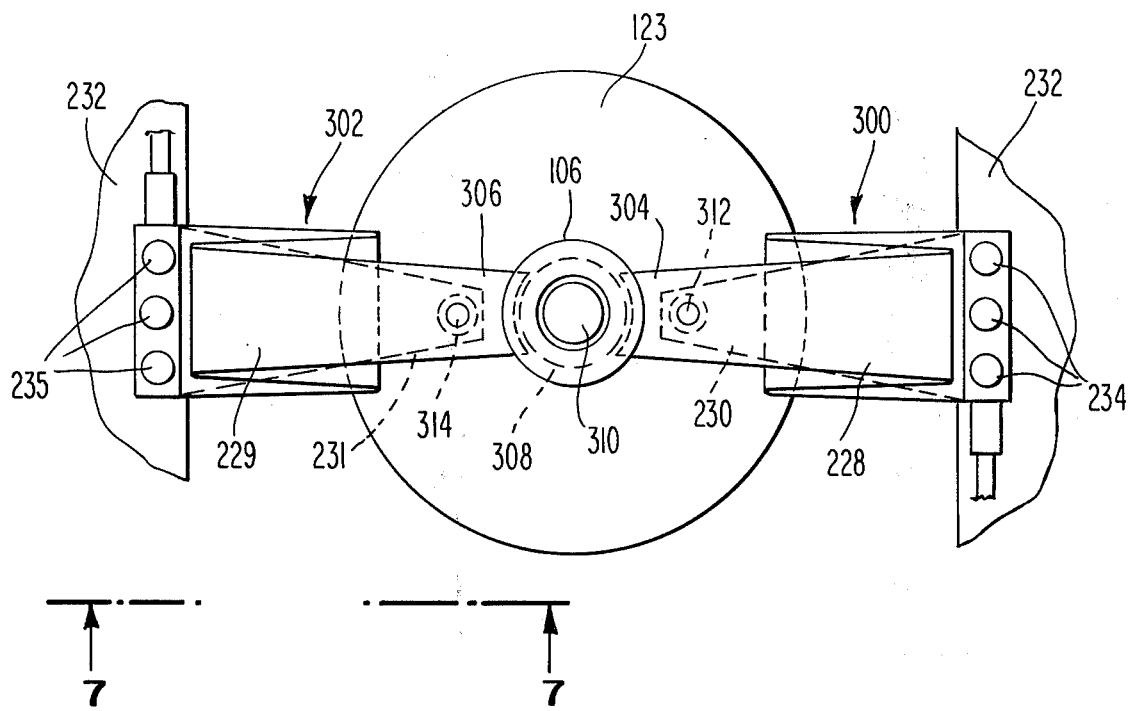
FIG. 6 is an end view similar to that illustrated in FIG. 5 but of a portion of a third embodiment of the present invention wherein two serpentive bimetallic links are axially disposed with respect to the axis of the pulley.

Referring now to FIG. 6, a third embodiment is illustrated utilizing serpentine bimetallic elements which are capable of amplifying the response of the bimetal 229 to a preselected increase in ambient temperatures therearound in a manner similar to that described in my prior issued U.S. Pat. No. 3,889,314. In the embodiment shown in FIG. 6, two serpentine bimetallic devices 300 and 302 having bimetals 228 and 229 respectively are mounted on mounts 232 and 233 by rivet sets 234 and 235, respectively. Heating reeds 230 and 231 make contact near the tips 304 and 306 of bimetallic devices 300 and 302 through contacts 312 and 314. The tips 304 and 306 are arcuately shaped to fit into annular groove 308 which is disposed in the pulley boss of pulley 123. As in the embodiment illustrated in FIG. 5, substantially greater axial forces may be applied to the pulley 123 to cause disengagement of the pulley from the torque transmitting means and for moving the pulley 123 to the second disengaged position.

Figure 7:
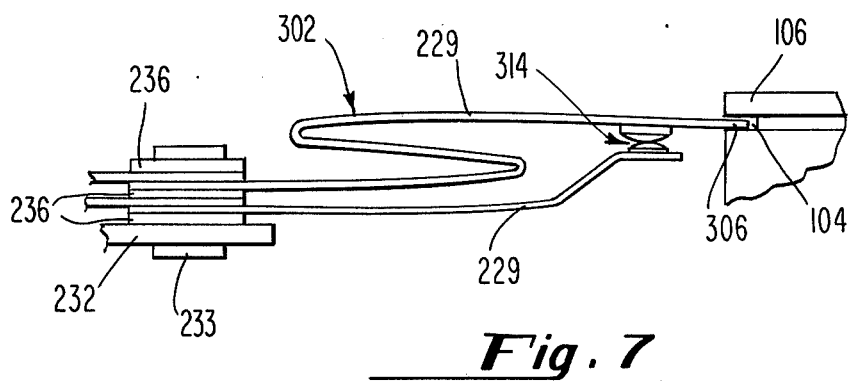
FIG. 7 is a greatly enlarged, partially cut-away side view of one of the serpentine bimetallic links shown in FIG. 6 wherein the interrelationship of the bimetal, annular groove and pulley boss are clearly illustrated.

FIG. 7 illustrates a greatly enlarged partially cut away side view of bimetallic device 302. With the exception of the serpentine configuration of the bimetal 229, which configuration acts to amplify the response of the bimetal to increases in the ambient temperature and/or heated temperature of the bimetal, the bimetallic device designated generally 302 is substantially similar to that incorporated in the other embodiments of the present invention. The bimetallic device 302 comprises bimetal tip 306, contact 314, heating reed 229, mount 232, insulation 236 and rivet 235. The bimetal tip 306 is seen to act within annular groove 104 on a cut-away portion of the pulley boss 106.

From the above, an extremely reliable, heat responsive clutch is provided which is capable of releasing the pulley from its associated torque transmitting means even when tremendous forces and tensions are present in cable 110. As a result, a clutch is provided with extremely good power transfer characteristics and which further provides quick, positive deployment upon heating of the heat responsive means either directly by ambient air or indirectly by remote control heating means.

It will be understood that various changes in the details, materials and arrangement of parts which have been herein described and illustrated in order to explain the nature of this invention may be made by those skilled in the art within the principle and scope of the invention as expressed in the following claims.

It will be further understood that the "Abstract of the Disclosure" set forth above is intended to provide a non-legal, technical statement of the contents of the disclosure in compliance with the Rules of Practice of the United States Patent and Trademark Office and is not intended to limit the scope of the invention described and claimed herein.

I claim

1. In a cable-controlled smoke or fire protected system, the apparatus comprising:
   a. a base;
   b. a motor mounted on said base having at least one one drive shaft;
   c. drive plate means mounted on said shaft for rotation therewith, said means comprising an outwardly directed pulley shaft coaxial with said drive shaft and a plurality of outwardly directed drive pins spaced radially apart around the axis of said drive shaft;
   d. a pulley mounted for rotation on said pulley shaft, said pulley having a plurality of drive pin slots, at least one for each drive pin, spaced radially apart around the axis of said pulley at positions corresponding to the positions of said drive pins, said pulley having a peripheral portion adapted to receive and coil said cable therearound; and
   e. a heat responsive means for moving said pulley between first and second positions along said pulley shaft, said drive pin slots engaging said drive pins in said first position for establishing a positive rotational engagement between said pulley and said drive plate means, whereby activation of said motor tends to coil said cable upon said pulley, said pulley being disengaged from said drive plate means and being rotationally controlled in said second position by said cable to activate said system at least in response to heat.

2. The invention of claim 1 wherein said heat responsive means comprises at least one bimetallic element mounted on said base.

3. The invention of claim 2 wherein said pulley further comprises a substantially coaxial boss having an annular groove formed therein and said heat responsive means further comprises at least one bimetallic element having an arcuate tip complementally configured to said annular groove to track therein, said pulley being moved between said first and said second positions in response to forces exerted by said tip on the sides of said groove.

4. The invention of claim 1 wherein said heat responsive means comprises at least one bimetallic element having a serpentine configuration.

5. The invention of claim 1 wherein said drive plate means further comprises a substantially planar drive plate and a plurality of spacer means for spacing said plate away from said pulley in said first position.

6. The invention of claim 2 wherein said apparatus further comprises electrical activation means for heating said bimetallic link by passing current directly therethrough.

7. The invention of claim 3 wherein said motor is a stall motor which is caused to stall by the force exerted by said cable when said cable is fully coiled on said pulley.

8. The invention of claim 1 wherein said motor is a break motor.

* * * * *